(12) United States Patent
Yang (10) Patent No.: US 11,956,416 B2
(45) Date of Patent: *Apr. 9, 2024

(54) IMAGE SENSING DEVICE AND METHOD OF OPERATING THE SAME

(71) Applicant: SK hynix Inc., Icheon-si (KR)

(72) Inventor: Yun Hui Yang, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/824,052

(22) Filed: May 25, 2022

(65) Prior Publication Data

US 2023/0029996 A1 Feb. 2, 2023

(30) Foreign Application Priority Data

Jul. 30, 2021 (KR) .................. 10-2021-0100811

(51) Int. Cl.
*H04N 17/00* (2006.01)
*H04N 25/63* (2023.01)
*H04N 25/633* (2023.01)

(52) U.S. Cl.
CPC .......... *H04N 17/002* (2013.01); *H04N 25/63* (2023.01); *H04N 25/633* (2023.01)

(58) Field of Classification Search
CPC .... H04N 17/002; H04N 25/63; H04N 25/633; H04N 25/60; H04N 25/79; H04N 25/703; H01L 27/14618
See application file for complete search history.

(56) References Cited

U.S. PATENT DOCUMENTS

| | | | |
|---|---|---|---|
| 10,165,211 B1* | 12/2018 | Borthakur | H04N 25/702 |
| 2009/0209058 A1* | 8/2009 | Kim | H01L 27/14623 |
| | | | 438/73 |
| 2014/0014818 A1* | 1/2014 | Cho | H01L 27/14601 |
| | | | 257/435 |
| 2014/0160259 A1* | 6/2014 | Blanquart | H04N 23/56 |
| | | | 348/65 |
| 2015/0116533 A1* | 4/2015 | Hsu | H04N 25/63 |
| | | | 348/223.1 |
| 2015/0162925 A1* | 6/2015 | Lee | H03M 1/1295 |
| | | | 250/208.1 |
| 2016/0277691 A1* | 9/2016 | Jo | H04N 25/67 |
| 2018/0040658 A1* | 2/2018 | Kang | H01L 31/024 |
| 2018/0138225 A1* | 5/2018 | Kim | H04N 25/75 |
| 2018/0261640 A1* | 9/2018 | Hwangbo | H04N 25/633 |
| 2020/0035727 A1* | 1/2020 | Jung | H01L 27/14621 |
| 2021/0013249 A1* | 1/2021 | Yang | H01L 27/1463 |
| 2021/0051289 A1* | 2/2021 | Chowdhury | H04N 25/77 |
| 2022/0417462 A1* | 12/2022 | Yang | H04N 25/69 |

FOREIGN PATENT DOCUMENTS

| | | | |
|---|---|---|---|
| JP | 5644530 B2 | 11/2014 | |
| JP | 2014225737 A | * 12/2014 | |
| JP | 6102585 B2 | 3/2017 | |
| WO | WO-2021163927 A1 | * 8/2021 | ............ F16L 59/029 |

* cited by examiner

*Primary Examiner* — Michael Lee
(74) *Attorney, Agent, or Firm* — Perkins Coie LLP (57) ABSTRACT

An image sensing device may include a plurality of test pixel blocks and a signal processing unit. The test pixel blocks may be simultaneously heated to different temperatures. The signal processing unit may be in communication with the test blocks and configured to obtain pixel signals for different colors, respectively, based on dark current information associated with the temperatures of the test pixel blocks.

19 Claims, 8 Drawing Sheets

IMAGE SENSING DEVICE AND METHOD OF OPERATING THE SAME

PRIORITY CLAIM AND CROSS-REFERENCES TO RELATED APPLICATION

This patent document claims the priority and benefits of Korean application number 10-2021-0100811, filed on Jul. 30, 2021, in the Korean Intellectual Property Office, which is incorporated herein by reference in its entirety.

TECHNICAL FIELD

Various embodiments of the disclosed technology generally relate to an image sensing device detecting a light to generate image data and a method of operating the image sensing device.

BACKGROUND

An image sensing device may capture an optical image using properties of a photosensitive semiconductor material reacted with a light. As industries such as an automobile, a medical treatment, a computer, a communication, etc., may have been developed, the image sensing device having a high performance may be widely used in various fields such as internet of things (IOT), a robot, a security camera, a medical camera, etc.

The image sensing device may be classified into a charge coupled device (CCD) type and a complementary metal oxide semiconductor (CMOS) type. The CCD type image sensing devices may have a relatively high image quality compared to the CMOS type image sensing device. However, the CCD type image sensing devices may have a relatively large size and relatively high power consumption. In contrast, the CMOS image sensing devices may have a relatively small size and relatively low power consumption compared to the CCD type image sensing devices. Further, because the CMOS type image sensing devices may be manufactured using CMOS fabrication technologies, an optical sensor and a signal-processing circuit may be integrated in a single chip, which allows the image sensing device to have a smaller size and results in reduction in production costs. The CMOS type image sensing devices have been developed for many applications including a mobile device.

SUMMARY

According to example embodiments of the disclosed technology, there may be provided an image sensing device. The image sensing device may include a first active test block, a second active test block, a first optical black test block, a second optical black test block and a signal processing unit. The first active test block may include first active pixels and a first heating element. The first active pixels may generate a first pixel signal corresponding to an incident light. The first heating element may provide heat to the first active pixels at a first temperature. The second active test block may include second active pixels and a second heating element. The second active pixels may generate a second pixel signal corresponding to the incident light. The second heating element may provide heat to the second active pixels at a second temperature higher than the first temperature. The first optical black test block may include first optical black pixels and a third heating element. The first optical black pixels may generate a third pixel signal irrelevant to the incident light. The third heating element may provide heat to the first optical black pixels at the first temperature. The second optical black test block may include a plurality of second optical black pixels and a fourth heating element. The second optical black pixels may generate a fourth pixel signal irrelevant to the incident light. The fourth heating element may provide heat to the second optical black pixels at the second temperature. The signal processing unit may process the first to fourth pixel signals.

According to example embodiments, there may be provided an image sensing device. The image sensing device may include a plurality of test pixel blocks and a signal processing unit. The test pixel blocks may be simultaneously heated to different temperatures. The signal processing unit may be in communication with the plurality of test pixel blocks and configured to obtain pixel signals for different colors, respectively, based on dark current information associated with the temperatures of the test pixel blocks.

According to example embodiments, there may be provided a method of operating an image sensing device. The method of operating the image sensing device includes heating a pixel array including active pixels and optical black pixels to a set temperature, heating a plurality of test pixel blocks to temperatures higher than the set temperature, extracting pixel signals in accordance with temperatures from the pixel array and the test pixel blocks, and obtaining pedestal information of the pixel array using the pixel signals.

BRIEF DESCRIPTION OF THE DRAWINGS

The above and another aspects, features and advantages of the subject matter of the present disclosure will be more clearly understood from the following detailed description taken in conjunction with the accompanying drawings.

DETAILED DESCRIPTION

Various embodiments of the disclosed technology will be described in greater detail with reference to the accompanying drawings. The drawings are schematic illustrations of various embodiments (and intermediate structures). As such, variations from the configurations and shapes of the illustrations as a result, for example, of manufacturing techniques and/or tolerances, are to be expected. Thus, the described embodiments should not be construed as being limited to the particular configurations and shapes illustrated herein but may include deviations in configurations and shapes which do not depart from the spirit and scope of the disclosed technology.

Embodiments of the disclosed technology should not be construed as limiting the inventive concept. Although a few embodiments of the disclosed technology will be shown and described, it will be appreciated by those of ordinary skill in the art that various changes may be made.

Figure 1:
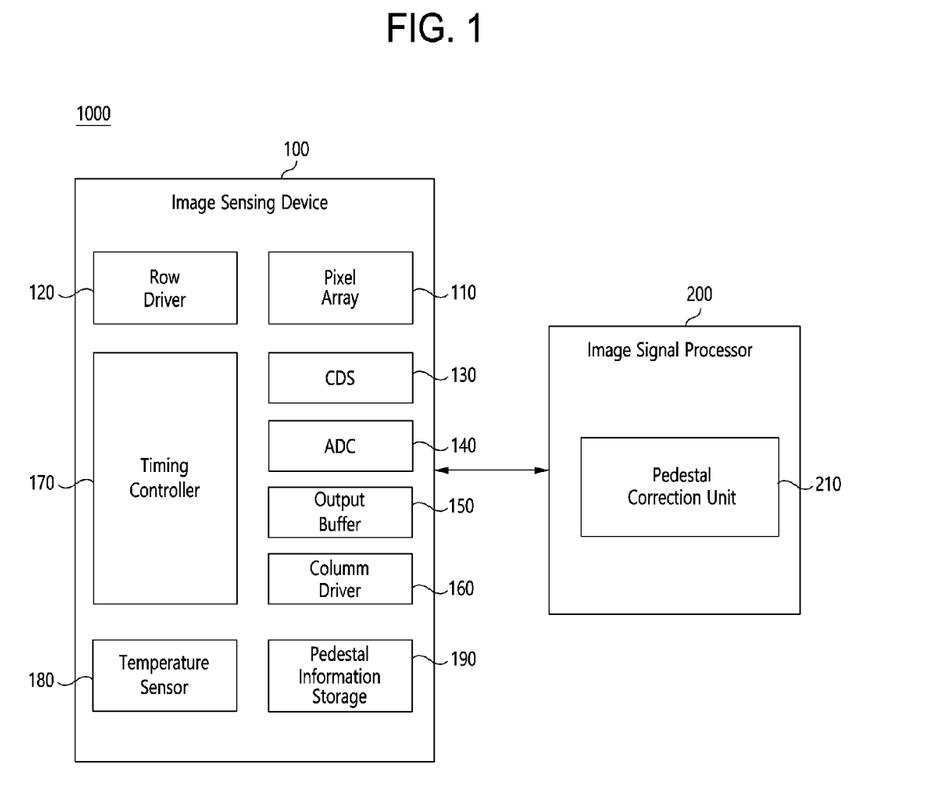
FIG. 1 is a block diagram illustrating a photographing device in accordance with example embodiments of the disclosed technology.
Figure 2:
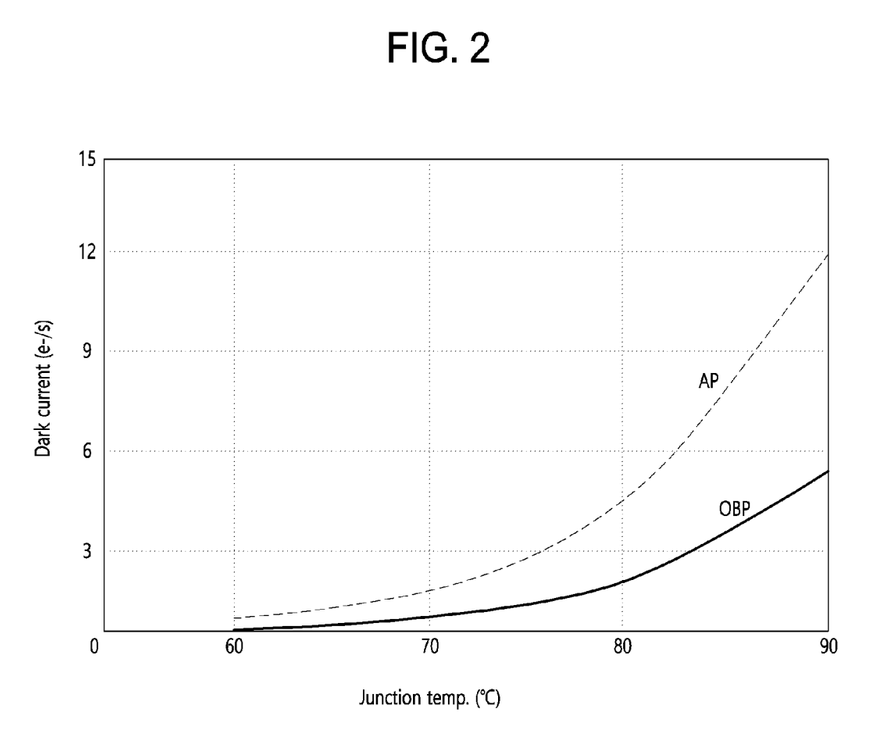
FIG. 2 is a graph showing dark currents of an active pixel and an optical black pixel.

FIG. 1 is a block diagram illustrating a photographing device in accordance with example embodiments and FIG. 2 is a graph showing dark currents of an active pixel and an optical black pixel.

Referring to FIG. 1, a photographing device 1000 may include a digital still camera configured to photograph a static image, a digital video camera configured to photograph a video, etc. For example, the photographing device 1000 may include a digital single lens reflex (DSLR), a mirror-less camera, a smart phone, etc., not limited thereto. The photographing device 1000 may include a lens and a photographing element configured to photograph an object and to generate an image.

The photographing device 1000 may include an image sensing device 100 and an image signal processing unit 200.

The image sensing device 100 may include a complementary metal oxide semiconductor image sensor (CIS) configured to convert an optical signal into an electrical signal. The image sensing device 100 may provide the image signal processing unit 200 with image data formed by converting the optical signal into the electrical signal. An on/off, an operation mode, a sensitivity, etc., of the image sensing device 100 may be controlled by a sensor control signal from the image signal processing unit 200.

The image sensing device 100 may include a pixel array 110, a row driver 120, a correlate double sampler (CDS) 130, an analog-digital converter (ADC) 140, an output buffer 150, a column driver 160, a timing controller 170, a temperature sensor 180, a pedestal information storage 190. The image sensing device 100 may include an additional component without being limited to those as shown in FIG. 1.

The pixel array 110 may include a plurality of unit pixel including a plurality of rows and a plurality of columns. In example embodiments, the unit pixels may be arranged in a two-dimensional pixel array including rows and columns. Alternatively, the unit pixels may be arranged in a three-dimensional pixel array.

The unit pixels may generate electrical signal in units of unit pixels or units of pixel groups. The unit pixels in the pixel group may commonly share at least specific internal circuit.

The unit pixels may include at least one active pixel and at least one optical black pixel. The active pixel may detect an incident light to generate a pixel signal corresponding to an intensity of the incident light. The optical black pixel may have a structure substantially the same as a structure of the active pixel. The optical black pixel may include a structure for blocking the incident light to generate a pixel signal irrelevant to the incident light.

The pixel array 110 may receive a drive signal including a row selection signal, a pixel reset signal, a transmission signal, etc., from the row driver 120. A corresponding unit pixel of the pixel array 110 may be activated to perform operations corresponding to the row selection signal, the pixel reset signal and the transmission signal.

The row driver 120 may activate the pixel array 110 to perform specific operations of unit pixels in a corresponding row based on commands and control signals by the timing controller 170. In example embodiments, the row driver 120 may select at least one unit pixel arranged in at least one row of the pixel array 110. The row driver 120 may generate the row selection signal for selecting the at least one row among the rows. The row driver 120 may sequentially enable the pixel reset signal and the transmission signal with respect to pixels corresponding to the selected row. Thus, an analog reference signal and an image signal generated from each of the pixels of the selected row may be sequentially transmitted to the CDS 130. The reference signal may be an electrical signal provided to the CDS 130 when a sensing node of the unit pixel, for example, a floating diffusion node may be reset. The image signal may be an electrical signal provided to the CDS 130 when a photo-charge generated by the unit pixel may be accumulated in the sensing node. The reference signal, which may represent an inherent reset noise of the pixel, and the image signal, which may represent the intensity of the incident light, may be referred to as the pixel signal.

The CIS may use a correlate double sampling to remove an undesired offset value of the pixel such as a fixed pattern noise by twice sampling the pixel signal for removing a difference between two samples. For example, the correlate double sampling may compare pixel output voltages with each other, which may be obtained before and after the optical-charge generated by the incident light may be accumulated in the sensing node, to remove the undesired offset value, thereby measuring a pixel output voltage based on only the incident light. In example embodiments, the CDS 130 may sequentially sample and hold the reference signal and the image signal provided to column lines from the pixel array 110. Thus, the CDS 130 may sample and hold the reference signal and the image signal corresponding to each of the columns of the pixel array 110.

The CDS 130 may transmit the reference signal and the image signal of each of the columns as a correlate double sampling signal to the ADC 140 based on a control signal of the timing controller 170.

The ADC 140 may convert the CDS signal with respect to each of the columns, which may be outputted from the CDS 130, into a digital signal. The ADC 140 may then output the digital signal. In example embodiments, the ADC 140 may include a ramp comparison type ADC. The ramp comparison type ADC may include a comparison circuit and a counter. The comparison circuit may compare a ramp signal, which may be increased or decrease in accordance with times, with an analog pixel signal. The counter may perform a counting operation until the ramp signal may be matched with the analog pixel signal. The ADC 140 may convert the CDS signal generated by the CDS 130 for each of the columns into the digital signal.

The ADC 140 may include a plurality of column counters corresponding to columns of the pixel array 110. Each of the columns of the pixel array 110 may be connected to the column counter. Image data and noise data may be generated by converting the CDS signal, which may correspond to the columns, into the digital signal using the column counters. Alternatively, the ADC 140 may include one global counter. The ADC 140 may convert the CDS signal, which may correspond to the columns, into the digital signal using a global code provided from the global counter. The image data may include a digital signal generated by converting the pixel signal outputted from the at least one image pixel. The noise data may include a digital signal generated by converting the pixel signal outputted from the at least one optical black pixel.

The output buffer 150 may temporarily hold and output the image data and the noise data by the columns provided from the ADC 140. The output buffer 150 may temporarily store the image data and the noise data outputted from the ADC 140 based on a control signal of the timing controller 170. The output buffer 150 may act as an interface configured to compensate a difference between transmission speeds or processing speeds of the image sensing device 100 and other devices connected to the image sensing device 100.

The column driver 160 may select column of the output buffer 150 based on the control signal of the timing controller 170. The column driver 160 may control the output buffer 150 to sequentially output the image data and the noise data temporarily stored in the selected column of the output buffer 150. In example embodiments, the column driver 160 may receive the address signal from the timing controller 170. The column driver 160 may generate a column selection signal based on the address signal to select the column of the output buffer 150, thereby outputting the image data and the noise data from the selected column of the output buffer 150 to the image signal processing unit 200.

The timing controller 170 may provide at least one of the row driver 120, the CDS 130, the ADC 140, the output buffer 150, the column driver 160, the temperature sensor 180 and the pedestal information storage 190 with the clock signal for operating the image sensing device 100, the control signal for a timing control and the address signals for selecting the row or the column. In example embodiments, the timing controller 170 may include a logic control circuit, a phase lock loop (PLL) circuit, a timing control circuit, a communication interface circuit, etc.

The timing controller 170 may receive temperature information from the temperature sensor 180 in accordance with the sensor control signal of the image signal processing unit 200. The timing controller 170 may read pedestal information corresponding to the temperature information from the pedestal information storage 190. The timing controller 170 may transmit the read pedestal information to the image signal processing unit 200 in response to the sensor control signal. The image signal processing unit 200 may perform a pedestal correction based on pedestal information.

The image data may include a dark noise component representing a dark current that may be generated by other factors than the incident light. The other factors may include such as a temperature, an inherent noise caused by a pixel structure, etc. The dark current may be generated by a dangling bond generated on a surface of a substrate. Charges by the dark current, which may be irrelevant to the incident light, may be introduced into a sensing region in the pixel, for example, a floating diffusion region so that the image data may include the dark noise component irrelevant to the incident light. Because the dark noise component may deteriorate an image quality, it may be required to remove the dark current component using the noise data generated from the optical black pixel including a structure configured to block the incident light.

In order to completely remove the dark noise component in the image data, the noise data may be substantially the same as the dark noise component of the image data.

FIG. 2 is a graph showing dark currents (e-/s; electron charge per second) of an active pixel and an optical black pixel.

The dark current of the active pixel may be referred to as the dark noise component of the image data. The dark current of the optical black pixel may be referred to the noise data. As shown in FIG. 2, the dark current of the active pixel may be not same as the dark current of the optical black pixel. A difference between the dark currents of the active pixel and the optical black pixel may increase in proportion to the increase of a junction temperature of the substrate with the pixels. Referring to FIG. 2, the difference between the dark currents of the active pixel and the optical black pixel is greater when the junction temperature is about 90° C. as compared to that when the junction temperature is about 60° C.

If removing the dark noise component in the image data using the noise data without considering the difference between the dark currents of the active pixel and the optical black pixel, the dark noise component of the image data cannot be completely removed. In this case, a correction of the noise data that corrects the noise data to be at a level substantially the same as a level of the dark noise component of the image data or corrects the noise data to represent the dark noise component of the image data is required. Such correction may be referred to as a pedestal correction.

Referring again to FIG. 1, the pedestal correction may be performed using the pedestal information for correcting the noise data such that the noise data is to be at the level substantially the same as the level of the dark noise component of the image data at a corresponding temperature. Thus, the pedestal information may be changed in accordance with the temperature. The pedestal information may include a pedestal correction value for correcting the noise data. The timing controller 170 may read the pedestal information corresponding to the temperature information from the pedestal information storage 190. The timing controller 170 may then transmit the read pedestal information to the image signal processing unit 200.

In the example embodiments, the pedestal information may include the pedestal correction values determined based on colors of the active pixel. For example, the pedestal correction values for a red, green, and blue colors may be different from one another. The differences between the dark currents of the active pixel and the optical black pixel at a same temperature for the different colors may be different from each other due to a difference between pixel structures by the colors, for example, a difference between optical filters on the substrate. The pedestal correction may be performed using the pedestal correction value independently determined based on the colors to accurately remove the dark noise component of the image data. The temperature of example embodiments may be the temperature of the substrate with the pixel array 110.

The temperature sensor 180 may measure an internal temperature of the image sensing device 100 in accordance with the control of the timing controller 170. The temperature sensor 180 may transmit the temperature information to the timing controller 170. In example embodiments, the temperature sensor 180 may measure the temperature of the substrate with the pixel array 110. When a measured temperature of the substrate with the pixel array 110 is about 60° C., a temperature of the substrate in a test region may be increased by test blocks, which is to be illustrated later.

The pedestal information storage 190 may store the pedestal information corresponding to the temperatures that are predetermined. The predetermined temperatures may be experimentally determined during a test as the temperatures in which the pedestal correction is to be required. The pedestal information corresponding to the temperatures may include pedestal correction values for the colors. The pedestal information storage 190 may store the pedestal information using a one-time programmable (OTP) memory in the pedestal information storage 190.

In FIG. 1, the temperature sensor 180 and the pedestal information storage 190 may be arranged in the image sensing device 100. Alternatively, at least one of the temperature sensor 180 and the pedestal information storage 190 may be arranged outside the image sensing device 100. For example, at least one of the temperature sensor 180 and the pedestal information storage 190 may be arranged in the image signal processing unit 200.

The image signal processing unit 200 may process the image data inputted from the image sensing device 100. The image signal processing unit 200 may control the image sensing device 100 in accordance with processed results or external input signals. The image signal processing unit 200 may reduce noises from the image data. The image signal processing unit 200 may perform an image signal process for improving the image quality such as a gamma correction, a color filter array interpolation, a color matrix, a color correction, a color enhancement, etc. Further, the image signal processing unit 200 may perform the image signal process for improving the image quality to compress the image data, thereby generating an image file or restoring image data from the image from the image file. The compression of the image data may be a reversible type or an irreversible type. When the image may be a static image, the compression of the image data may include a joint photographic expert group (JPEG) or JPEG 2000. In contrast, when the image may be a video, a plurality of frames may be compressed in accordance with a moving picture experts group (MPEG) standard to generate a video file. For example, the video file may be generated in accordance with an exchangeable image file format (EXIF).

The image data outputted from the image signal processing unit 200 may be stored in an internal memory or an external memory of the photographing device 1000 in accordance with a request of a user or automatically. The image data may be displayed on a display.

The image signal processing unit 200 may perform a non-sharpness process, a blur process, an edge emphasis process, an image interpretation process, an image recognition process, an image effect process, etc.

The image signal processing unit 200 may perform a display image signal process for the display. For example, the image signal processing unit 200 may perform a luminance level control, a color correction, a contrast control, a contour emphasis control, a picture division process, a character image generation, an image synthesis process, etc.

The image signal processing unit 200 may include a pedestal corrector 210.

The pedestal corrector 210 may request the pedestal information to the image sensing device 100 using the sensor control signal. The pedestal corrector 210 may receive the pedestal information corresponding to a current temperature from the image sensing device 100.

The pedestal information may include a pedestal correction value for correcting the noise data to be at the level substantially the same as the level of the dark noise component of the image data or to represent the dark noise component of the image data. The pedestal correction value may be a ratio between the dark current of the active pixel corresponding to a specific color, for example, the red, the green or the blue at a specific temperature, for example, about 60° C., about 70° C., about 80° C. or about 90° C. and the dark current of the corresponding optical black pixel. The pedestal corrector 210 may calculate the pedestal correction value (for example, 1.8) for the noise data corresponding to the specific color (for example, the red) to correct the noise data, thereby making the noise data be at the level substantially the same as the level of the dark noise component of the image data. The pedestal correction may be independently performed for each color.

The pedestal corrector 210 may provide the corrected noise data for each color by performing the pedestal correction. It is possible to remove the dark noise component from the image data by calculating the image data corresponding to the specific color (for example, the red) and the corrected noise data corresponding to the same color (for example, the red) of the image data.

Figure 3:
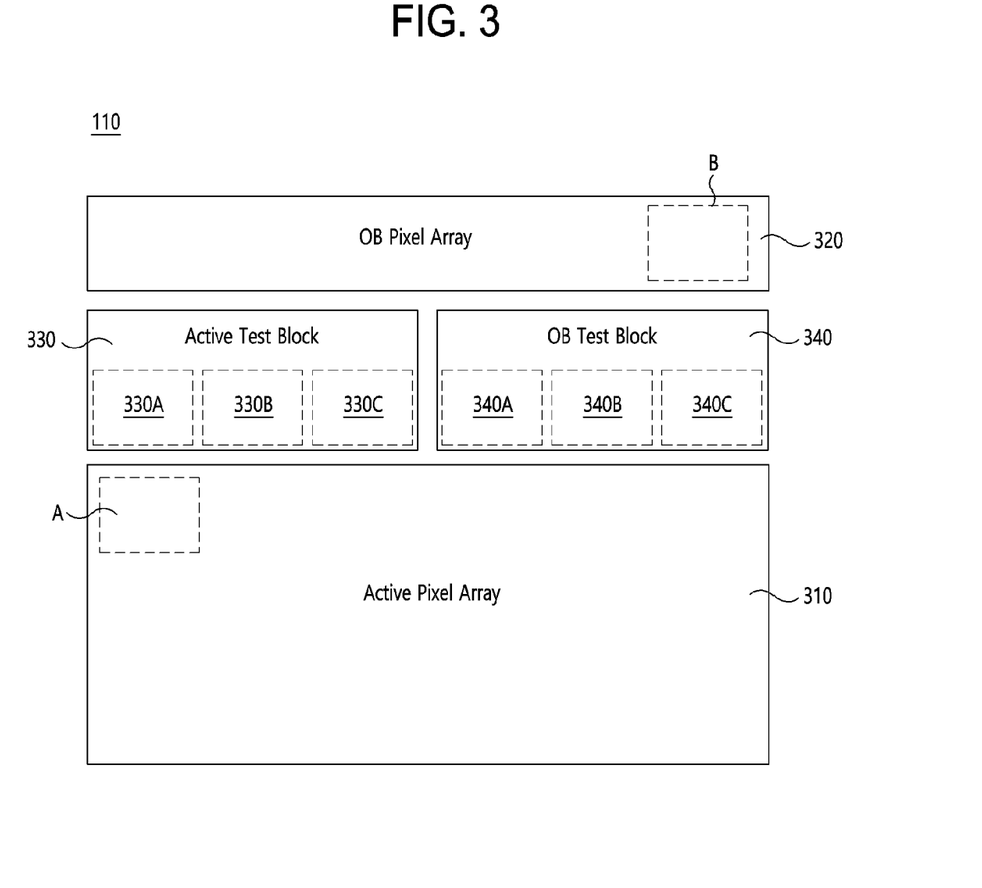
FIG. 3 is a block diagram illustrating a pixel array in accordance with example embodiments of the disclosed technology.

FIG. 3 is a block diagram illustrating a pixel array in accordance with example embodiments.

Referring to FIG. 3, the illustrated example of the pixel array 110 may include separate regions such as an active pixel array 310, an optical black pixel array 320, an active test block 330 and an optical black test block 340.

The active test block 330 may be arranged at one side of the active pixel array 310. The optical black test block 340 may be arranged at the other side of the optical black pixel array 320. In the example as shown FIG. 3, the active test block 330 and the optical black test block 340 may be arranged between the active pixel array 310 and the optical black pixel array 320.

Relative positions and sizes of the active pixel array 310, the optical black pixel array 320, the active test block 330 and the optical black test block 340 may be changed in accordance with example embodiments.

The active pixel array 310 may include active pixels detecting the incident light to generate the pixel signal. In FIG. 3, one block of the active pixel array 310 may be indicated by "A".

The optical black pixel array 320 may include optical black pixels configured to generate the pixel signal without being exposed to the incident light and thus that the pixel signal is irrelevant to the incident light. In FIG. 3, one block of the optical black pixel array 320 may be indicated by "B".

The active test block 330 may include an element configured to control the active pixels and temperatures of the active pixels of the active pixel array 310. The active test block 330 may be used for obtaining the dark current of the active pixel by the colors at certain set temperatures during the test.

In example embodiments, the active test block 330 may include a first active test block 330A, a second active test block 330B and a third active test block 330C. The first active test block 330A, the second active test block 330B and the third active test block 330C may have different temperatures. For example, when the temperature of the block A of the active pixel array 310 may have a temperature of is about 60° C., the first active test block 330A may have a first temperature (e.g., about 70° C.), the second active test block 330B may have a second temperature (e.g., about 80° C.) and the third active test block 330C may have a third temperature (e.g., about 90° C.). Implementations of the active test block 330 can vary with respect to the number of active test blocks without being limited to the example as shown in FIG. 3. Specifically, the active test block 330 may include more or less active test blocks with respect to the specific example in FIG. 3.

The optical black test block 340 may include an element configured to control the optical black pixels and temperatures of the optical black pixels of the optical black pixel array 320. The optical black test block 340 may be used for obtaining the dark current of the optical black pixel by the colors at set temperatures during the test.

In example embodiments, the optical black test block 340 may include a first optical black test block 340A, a second optical black test block 340B and a third optical black test block 340C, not limited thereto. The first optical black block 340A, the second optical black test block 340B and the third optical black test block 340C may have different temperatures. For example, when the temperature of the block B of the optical black pixel array 320 may have a temperature of is about 60° C., the first optical black test block 340A may have a first temperature (e.g., about 70° C.), the second optical black test block 340B may have a second temperature (e.g., about 80° C.) and the third optical black test block 340C may have a third temperature (e.g., about 90° C.).

Figure 4A:
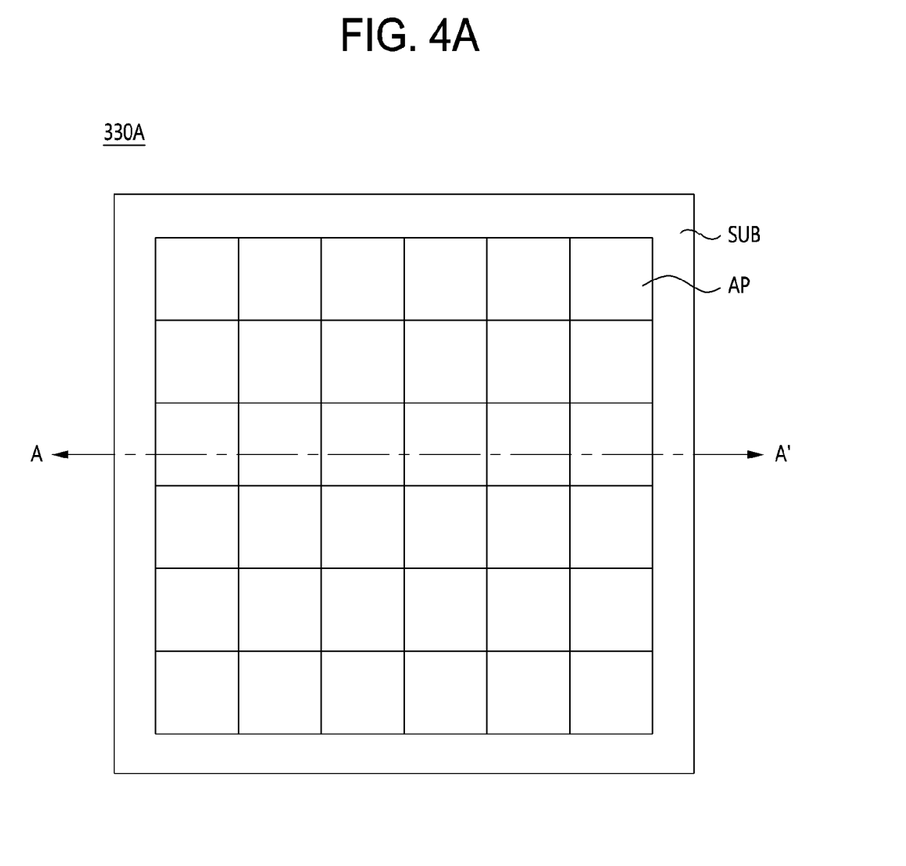
FIGS. 4A and 4B are views illustrating an active test block in FIG. 3.
Figure 4B:
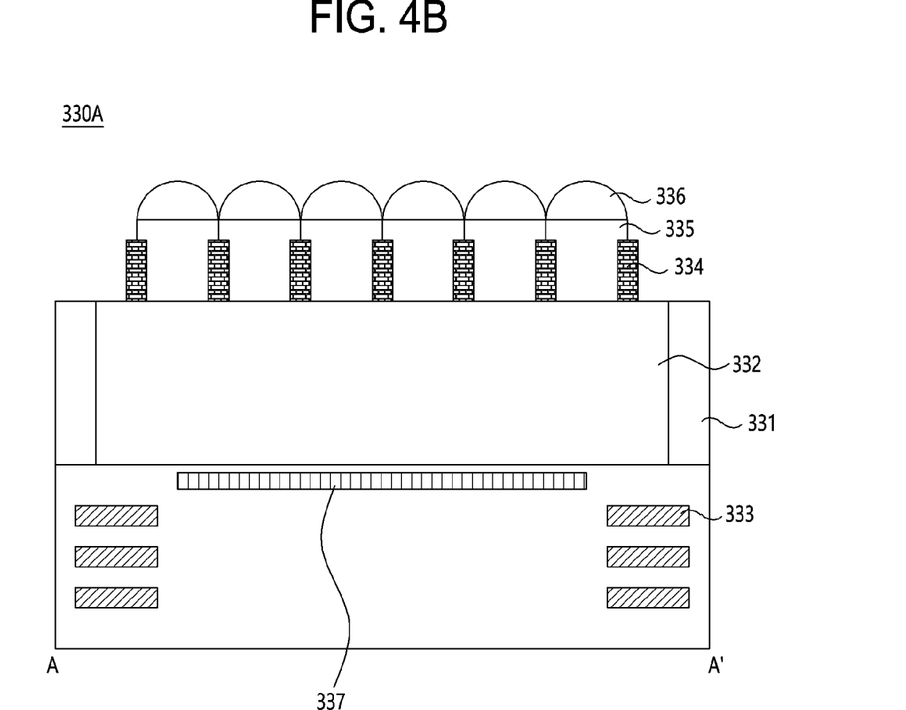

FIGS. 4A and 4B are views illustrating an active test block in FIG. 3. FIG. 4B is a cross-sectional view taken along a line A-A' in FIG. 4A.

FIGS. 4A and 4B may exemplarily show the first active test block 330A. Referring to FIGS. 4A and 4B, the first active test block 330A may include a plurality of first active pixels AP and a first heating element 337. The second and third active test blocks 330B and 330C may have a configuration substantially the same as the configuration of the first active test block 330A. However, different temperatures may be applied to the first to third active test blocks 330A, 330B and 330C. Thus, the second active test block 330B may include a plurality of second active pixels and a second heating element. The third active test block 330C may include a plurality of third active pixels and a third heating element. The block A of the active pixel array 310 may include only a plurality of active pixels without a heating element.

Referring to FIGS. 4A and 4B, the first active test block 330A may include the first active pixels AP and the first heating element 337.

The first active pixels AP may be arranged in a matrix shape on a plane. In FIG. 4A, the active pixel AP may be arranged in a (6×6) matrix shape including six rows and six columns, not limited thereto. Each of the first active pixels AP may have a structure substantially the same as a structure of the active pixel in the active pixel array 310 in FIG. 3.

The first active pixels AP may be arranged on a substrate 331 with a doping region 332. Each of the first active pixels AP may include an optical grid structure 334, an optical filter 335 and a micro-lens 336.

The substrate 331 may have an upper surface and a lower surface opposite to the upper surface. The substrate 331 may include a P type or an N type bulk substrate, a P type bulk substrate with a P type or an N type epitaxial layer, an N type bulk substrate with a P type or an N type epitaxial layer, etc. The substrate 331 may include a P conductive type or an N conductive type doping region 332.

The doping region 332 may include a photoelectric conversion region arranged corresponding to each of the first active pixels AP. The photoelectric conversion region may be an N type doping region formed by implanting N type ions into the substrate 331. In example embodiments, the photoelectric conversion region may include a plurality of stacked doping regions. A lower doping region may be formed by implanting N$^+$ type ions. An upper doping region may be formed by implanting N$^-$ type ions. In order to increase a fill-factor for representing light-receiving efficiency, the photoelectric conversion region may be formed in a large area. An isolation layer, which may have a vertical trench shape, may be formed between the photoelectric conversion regions of the first active pixels AP to electrically and optically isolate the photoelectric conversion regions from each other.

The photoelectric conversion region may generate and accumulate photo-charges corresponding to the intensity of the incident light. The photo-charges accumulated in the photoelectric conversion region may be converted into the pixel signal as an electrical signal through an additional pixel signal circuit. For example, the pixel signal circuit may include a transmission transistor of a 4-transistor, a floating diffusion region, a reset transistor, a source follower transistor and a selection transistor, etc., not limited thereto. The pixel signal circuit may be included in a wiring element 333 under the doping region 332.

The optical grid structure 334 may prevent an optical crosstalk between the adjacent first active pixels AP. That is, the optical grid structure 334 may block a transmission of the incident light, which may be incident to the optical filter 335 of the first active pixel, to the optical filter 335 of the other first active pixel. The optical grid structure 334 may be arranged along a boundary between the adjacent first active pixels AP. The optical grid structure 334 may include a material for blocking the light. For example, the optical grid structure 334 may include tungsten (W) having a high light absorption.

The optical filter 335 may be formed on the substrate 331 to selectively allow a transmission of the light having a specific wavelength band, for example, the red, the green, the blue, the magenta, the yellow, the cyan, etc., therethrough. Each of the first active pixels may be named corresponding to kinds of the optical filter 335 in the first active pixel. For example, the first active pixel AP including the optical filter 335 through which the red light may pass may be defined by a red active pixel. The first active pixel AP including the optical filter 335 through which the green light may pass may be defined by a green active pixel. The first active pixel AP including the optical filter 335 through which the blue light may pass may be defined by a blue active pixel.

The micro-lens 336 may be formed on the optical filter 335. The micro-lens 336 may increase light gathering power of the incident light to improve the light-receiving efficiency of the photoelectric conversion region in the first active pixel. In FIG. 4B, one first active pixel may correspond to one micro-lens 336. Alternatively, a plurality of the first active pixels may correspond to one micro-lens 336.

The first heating element 337 may be arranged under the first active pixels AP. The first heating element 337 may be arranged between the wiring element 333 and the doping region 332. The first heating element 337 may generate heat corresponding to the first active test block 330A. The first heating element 337 may transfer the heat to the first active pixels AP. For example, the first heating element 337 may heat the first active test block 330A to a first temperature (e.g., about 70° C.). The second heating element may heat the second active test block 330B to a second temperature (e.g., about 80° C.). The third heating element may heat the third active test block 330C to a third temperature (e.g., about 90° C.).

The first heating element 337 may be arranged under the first active pixels AP to transfer the heat to the first active pixels AP. The location of the first heating element 337 may be varied. For example, the first heating element 337 may be located at a position where the heat may be effectively transferred to the first active pixels AP.

Figure 5A:
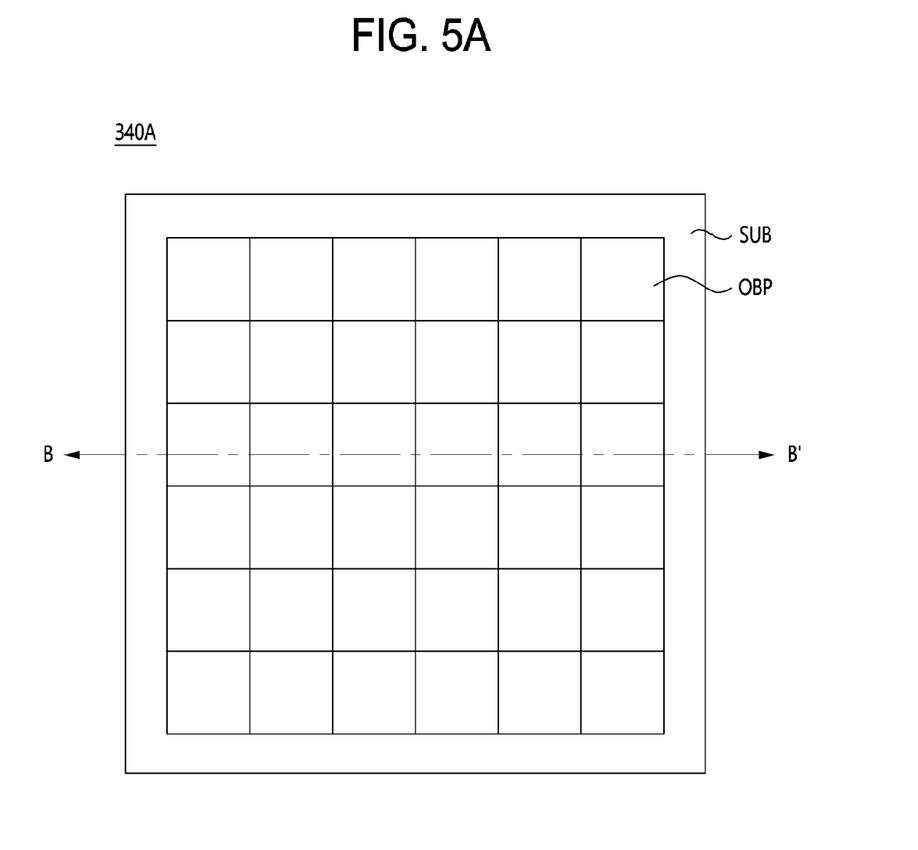
FIGS. 5A and 5B are views illustrating an optical test block in FIG. 3.
Figure 5B:
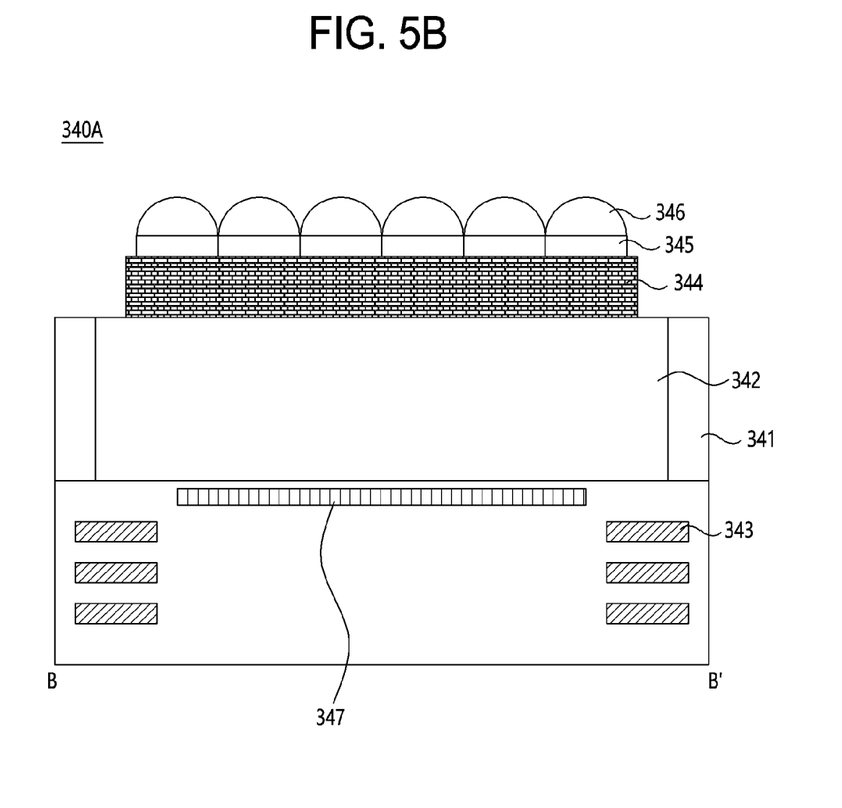

FIGS. 5A and 5B are views illustrating an optical test block in FIG. 3. FIG. 5B is a cross-sectional view taken along a line B-B' in FIG. 5A.

FIGS. 5A and 5B may exemplarily show the first optical black test block 340A. Referring to FIG. 5A, the first optical black test block 340A may include a plurality of first optical black pixels OBP and a first heating element 347. The second and third optical black test blocks 340B and 340C may have a configuration substantially the same as the configuration of the first optical black test block 340A. However, different temperatures may be applied to the first to third optical black test blocks 340A, 340B and 340C. That is, the second optical black test block 340B may include a plurality of second optical black pixels and a second heating element. The third optical black test block 340C may include a plurality of third optical black pixels and a third heating element. The block B of the optical black pixel array 320 may include only a plurality of optical black pixels without a heating element.

Referring to FIGS. 5A and 5B, the first optical black test block 340A may include the first optical black pixels OBP and the first heating element 347.

The first optical black pixels OBP may be arranged in a matrix shape on a plane. In FIG. 5A, the optical black pixel OBP may be arranged in a (6×6) matrix shape including six rows and six columns, not limited thereto. Each of the first optical black pixels OBP may have a structure substantially the same as a structure of the optical black pixel in the optical black pixel array 320 in FIG. 3.

Each of the first optical black pixels OBP may include a substrate 341, a light-blocking structure 344, an optical filter 345, a micro-lens 346 and a first heating element 347. The first optical black pixel OBP may have a configuration substantially the same as a configuration of the second and third optical black pixels. Thus, only the first optical black pixel OBP may be illustrated in detail and any further illustrations with respect to the second and third optical black pixels may be omitted herein for brevity.

The substrate 341 and the micro-lens 346 may be substantially the same as the substrate 331 and the micro-lens 336 in FIG. 4B. Thus, any further illustrations with respect to the substrate 341 and the micro-lens 346 may be omitted herein for brevity. The substrate 341 may include a doping region 342 and a wiring element 343 including a pixel signal circuit.

The light-blocking structure 344 may be arranged on all the first optical black pixels OBP differently from the optical grid structure 334 in FIG. 4B. Thus, the light-blocking structure 344 may block a light incident to an upper region of the light-blocking structure 344 so that the light may not be transmitted to the substrate 341.

The light-blocking structure 344 may include a material for blocking the light. For example, the light-blocking structure 344 may include tungsten (W) having a high light absorption. The light-blocking structure 344 may be formed by a process for forming the optical grid structure 334.

The optical filter 345 may be arranged over the light-blocking structure 344, differently from the optical filter 335 in FIG. 4B arranged between the adjacent optical grid structures 334. The first optical black pixels OBP may be named based on the types of the optical filter 345 in the corresponding first optical black pixels. For example, the first optical black pixel OBP including the optical filter 345 through which the red light may pass may be referred to as a red optical black pixel. The first optical black pixel OBP including the optical filter 345 through which the green light may pass may be referred to as a green optical black pixel. The first optical black pixel OBP including the optical filter 345 through which the blue light may pass may be referred to as a blue optical black pixel.

The optical filter 345 may be substantially the same as the optical filter 335 except for the above-mentioned difference. Thus, any further illustrations with respect to the optical filter 345 may be omitted herein for brevity.

The first heating element 347 may be arranged under the first optical black pixels OBP. The first heating element 347 may be arranged between the wiring element 343 and the doping region 342. The first heating element 347 may generate heat corresponding to the first optical black test block 340A. The first heating element 347 may transfer the heat to the first optical black pixels OBP. For example, the first heating element 347 may heat the first optical black test block 340A to a temperature of about 70° C. The second heating element may heat the second optical black test block 340B to a temperature of about 80° C. The third heating element may heat the third optical black test block 340C to a temperature of about 90° C.

The first heating element 347 may be arranged under the first optical black pixels OBP to transfer the heat to the first optical black pixels OBP, not limited thereto. That is, the first heating element 347 may be located at a position where the heat may be effectively transferred to the first optical black pixels OBP.

Figure 6:
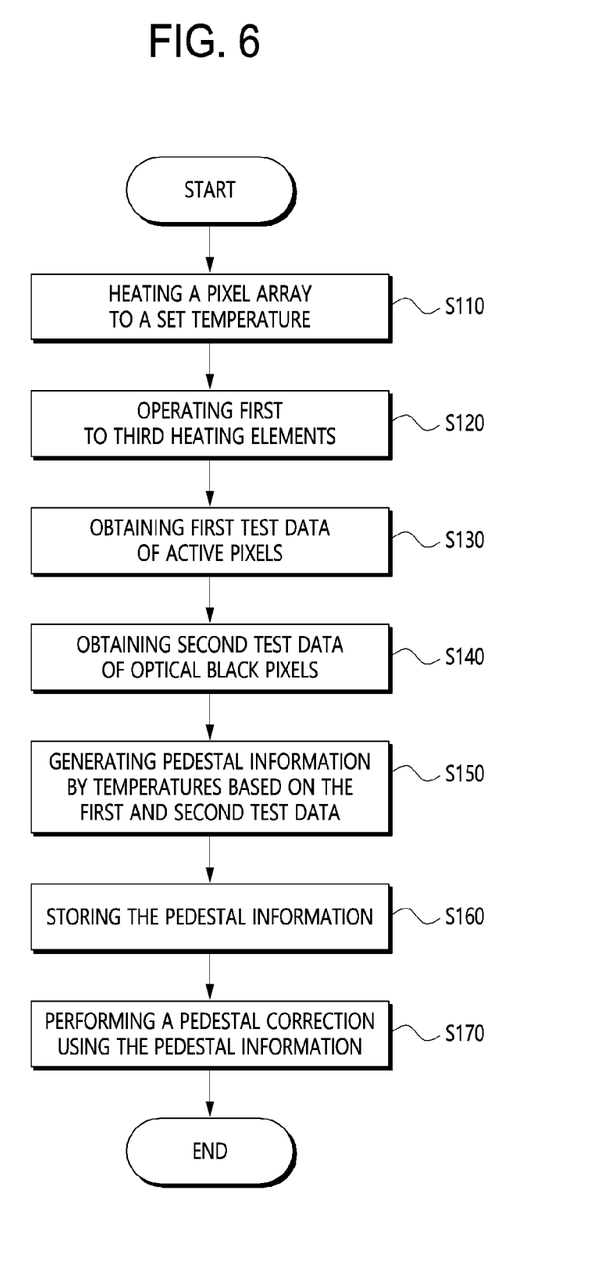
FIG. 6 is a flow chart illustrating a method of operating an image sensing device in accordance with example embodiments of the disclosed technology.

FIG. 6 is a flow chart illustrating a method of operating an image sensing device in accordance with example embodiments.

FIG. 6 may show operations for testing a chip including the image sensing device. Further, the operations may be performed under a condition that the light may be blocked almost completely or completely. The operations may be performed for obtaining the pedestal information that may represent the ratio between the dark current of the active pixel generated irrelevant to the light and the dark current of the optical black pixel.

In step S110, when a set temperature, for example, about 60° C. may be detected from the pixel array, in step S120, the first to third heating elements of the active test blocks and the first to third heating elements of the optical black test blocks may be heated to the set temperature corresponding to the heating control signal. The heated first to third heating elements may reach to different temperatures higher than the set temperature. The first heating elements, the second heating elements and the third heating elements may simultaneously reach to about 70° C., about 80° C. and about 90° C., respectively.

The pixel signal corresponding to the temperature may be extracted from the active pixels and the optical black pixels. In example embodiments, the first pixel signal may be extracted from the active pixels in the "A" block having the temperature of about 60° C. The second pixel signal may be extracted from the optical black pixels in the "B" block having the temperature of about 60° C.

The third pixel signal may be extracted from the first active pixels in the first active test block 330A having the temperature of about 70° C. The fourth pixel signal may be extracted from the first optical black pixels in the first optical black test block having the temperature of about 70° C.

The fifth pixel signal may be extracted from the second active pixels in the second active test block having the temperature of about 80° C. The sixth pixel signal may be extracted from the second optical black pixels in the second optical black test block having the temperature of about 80° C.

The seventh pixel signal may be extracted from the third active pixels in the third active test block having the temperature of about 90° C. The eighth pixel signal may be extracted from the third optical black pixels in the third optical black test block having the temperature of about 90° C.

Each of the first active pixels of the first active test block having the set temperature, for example, about 70° C. may generate the third pixel signals. The third pixel signal of each of the first active pixels may be converted into a digital value by the CDS, the ADC and the output buffer. The digital value may then be outputted. In example embodiments, the first active pixels may include the red active pixels, the green active pixels and the blue active pixels. In this case, the test device may calculate the digital values corresponding to the red active pixels, for example, a mean value calculation to obtain a red active test data. The test device may calculate the digital values corresponding to the green active pixels, for example, a mean value calculation to obtain a green active test data. The test device may calculate the digital values corresponding to the blue active pixels, for example, a mean value calculation to obtain a blue active test data. The red active test data may represent the dark noise component caused by the dark current generated in the red active pixels at the set temperature. The green active test data may represent the dark noise component caused by the dark current generated in the green active pixels at the set temperature. The blue active test data may represent the dark noise component caused by the dark current generated in the blue active pixels at the set temperature. The red active test data, the green active test data and the blue active test data may be referred to as first test data.

Although it has been described above that the first test data includes the active test data from the first active test block, the first test data obtained in step S130 may further include the active test data from the second and third active test blocks. The active test data corresponding to the colors of the second and third active test blocks may be obtained similarly to the process for obtaining the active test data corresponding to colors of the first active test block 330A. Thus, any further illustrations with respect to the process for obtaining the active test data corresponding to the colors of the second and third active test blocks may be omitted herein for brevity.

Each of the first optical black pixels of the first optical black test block 340A having the set temperature, for example, about 70° C. may generate the fourth pixel signals. The fourth pixel signal of each of the first optical black pixels may be converted into a digital value by the CDS, the ADC and the output buffer. The digital value may then be outputted. In example embodiments, the first optical black pixels may include the red optical black pixels, the green optical black pixels and the blue optical black pixels. In this case, the test device may calculate the digital values corresponding to the red optical black pixels, for example, a mean value calculation to obtain a red optical black test data. The test device may calculate the digital values corresponding to the green optical black pixels, for example, a mean value calculation to obtain a green optical black test data. The test device may calculate the digital values corresponding to the blue optical black pixels, for example, a mean value calculation to obtain a blue optical black test data. The red optical black test data may represent the dark noise component caused by the dark current generated in the red optical black pixels at the set temperature. The green optical black test data may represent the dark noise component caused by the dark current generated in the green optical black pixels at the set temperature. The blue optical black test data may represent the dark noise component caused by the dark current generated in the blue optical black pixels at the set temperature. The red optical black test data, the green optical black test data and the blue optical black test data may be referred to as second test data.

Although it has been described above that the second test data includes the optical black test data from the first optical black test block, the second test data obtained in step S140 may further include the optical black test data from the second and third optical black test blocks. The optical black test data corresponding to the colors of the second and third optical black test blocks may be obtained similarly to the process for obtaining the optical black test data corresponding to colors of the first optical black test block. Thus, any further illustrations with respect to the process for obtaining the optical black test data by the colors of the second and third optical black test blocks may be omitted herein for brevity.

In step S150, the pedestal information with respect to each of the set temperatures may be generated based on the first and second test data. Thus, the pedestal information may be associated with the pixel signals of the active pixels AP and the pixel signals of the optical black pixel OBP.

In example embodiments, a value obtained by dividing the red active test data of the first test data by the red optical black test data of the second test data may be determined as a red pedestal correction value with respect to the set temperature. Thus, the red pedestal correction value with respect to the set temperature may be the ratio between the dark noise component by the dark current of the red active pixel and the dark noise component by the dark current of the red optical black pixel.

A value obtained by dividing the green active test data of the first test data by the green optical black test data of the second test data may be determined as a green pedestal correction value with respect to the set temperature. Thus, the green pedestal correction value with respect to the set temperature may be the ratio between the dark noise component by the dark current of the green active pixel and the dark noise component by the dark current of the green optical black pixel.

A value obtained by dividing the blue active test data of the first test data by the blue optical black test data of the second test data may be determined as a blue pedestal correction value with respect to the set temperature. Thus, the blue pedestal correction value with respect to the set temperature may be the ratio between the dark noise component by the dark current of the blue active pixel and the dark noise component by the dark current of the blue optical black pixel.

In step S160, the pedestal information including the red pedestal correction value, the green pedestal correction value and the blue pedestal correction value may correspond to the set temperature. The pedestal information may then be stored in the pedestal information storage.

The pedestal corrector of the image signal processing unit may calculate the pedestal correction value, for example, the red pedestal correction value, which may correspond to the same color with respect to the noise data corresponding to the specific color, to perform the pedestal correction, thereby providing the noise data at the level substantially the same as the level of the dark noise component of the image data.

According to some implementations of the disclosed technology, by including the test block for generating the pedestal information to the chip including the image sensing device and performing the pedestal correction using the pedestal information independently stored in the chip, it is possible to accurately remove the dark noise component from the image data.

Further, the test blocks may be simultaneously heated to the different temperatures and the pedestal information corresponding to different temperatures can be obtained. Thus, the pedestal correction may be performed using the pedestal information corresponding to different temperatures, which results to more accurately remove the dark noise component from the image data.

While this patent document contains many specifics in the disclosed examples, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few embodiments and examples are described. Other embodiments, enhancements and variations can be made based on what is described and illustrated in this patent document.

What is claimed is:

1. An image sensing device comprising:
   a first active test block including first active pixels and a first heating element, each of the first active pixels configured to generate a first pixel signal corresponding to incident light, and the first heating element configured to provide heat to the first active pixels at a first temperature;
   a second active test block including second active pixels and a second heating element, each of the second active pixels configured to generate a second pixel signal corresponding to the incident light, and the second heating element configured to provide heat to the second active pixels at a second temperature higher than the first temperature;
   a first optical black test block including first optical black pixels and a third heating element, each of the first optical black pixels configured to generate a third pixel signal irrelevant to the incident light, and the third heating element configured to provide heat to the first optical black pixels at the first temperature;
   a second optical black test block including second optical black pixels and a fourth heating element, each of the second optical black pixels configured to generate a fourth pixel signal irrelevant to the incident light, and the fourth heating element configured to provide heat to the second optical black pixels at the second temperature; and
   a signal processing unit configured to process the first to fourth pixel signals.

2. The image sensing device of claim 1, further comprising:
   an active pixel array including active pixels configured to generate a fifth pixel signal corresponding to the incident light at a third temperature lower than the first temperature; and
   an optical black pixel array including optical black pixels configured to generate a sixth pixel signal irrelevant to the incident light at the third temperature.

3. The image sensing device of claim 2, further comprising a noise information storage configured to store information that is related to noise of the first to sixth pixel signals and is generated based on the first to sixth pixel signals.

4. The image sensing device of claim 3, wherein the noise information storage is configured to store the noise information with respect to colors associated with the first to third temperatures, respectively.

5. The image sensing device of claim 4, wherein the colors comprise at least one of red, green, blue, magenta, cyan or yellow.

6. The image sensing device of claim 2, further comprising:
   a third active test block including third active pixels and a fifth heating element, each of the third active pixels configured to generate a seventh pixel signal corresponding to the incident light, and the fifth heating element configured to provide heat to the third active pixels at a fourth temperature higher than the second temperature; and
   a third optical black test block including of third optical black pixels and a sixth heating element, each of the third optical black pixels configured to generate an eighth pixel signal irrelevant to the incident light, and the sixth heating element configured to provide heat the third optical black pixels at the fourth temperature.

7. The image sensing device of claim 1, wherein the first active test block comprises a substrate including a doping region and a wiring element arranged under the doping region, the first active pixels are arranged on the substrate and the first heating element is arranged between the doping region and the wiring element.

8. The image sensing device of claim 1, wherein the second active test block comprises a substrate including a doping region and a wiring element arranged under the doping region, the second active pixels are arranged on the substrate and the second heating element is arranged between the doping region and the wiring element.

9. The image sensing device of claim 1, wherein the first optical black test block comprises a substrate including a doping region and a wiring element arranged under the doping region, the first optical black pixels are arranged on the substrate and the third heating element is arranged between the doping region and the wiring element.

10. The image sensing device of claim 1, wherein the second optical black test block comprises a substrate including a doping region and a wiring element arranged under the doping region, the second optical black pixels are arranged on the substrate and the fourth heating element is arranged between the doping region and the wiring element.

11. An image sensing device comprising:
    a plurality of test pixel blocks simultaneously heated to different temperatures; and
    a signal processing unit in communication with the plurality of the test pixel blocks and configured to obtain pixel signals for different colors, respectively, based on dark current information associated with temperatures of the test pixel blocks,
    wherein at least one of the plurality of test pixel blocks comprises:
    a first block including first optical black pixels and first active pixels that are heated to a first temperature; and
    a second block including second optical black pixels and second active pixels that are heated to a second temperature higher than the first temperature.

12. The image sensing device of claim 11, wherein the signal processing unit is configured to calculate pedestal information based on the pixel signals for the different colors in accordance with the temperatures.

13. The image sensing device of claim 11, further comprising:
an active pixel array including active pixel blocks configured to respond to incident light; and
an optical pixel array including optical pixel blocks including light blocking structures configured to block the incident light to enter the optical pixel array.

14. The image sensing device of claim 13, wherein the signal processing unit is configured to calculate correction values, each correction value allowing to make a dark current of a corresponding optical pixel block at a level same as that of a dark noise component of a corresponding active pixel.

15. The image sensing device of claim 14, wherein the signal processing unit is configured to calculate correction values for each color such that the correction values for different colors are different from one another.

16. The image sensing device of claim 14, wherein each correction value is calculated to represent a ratio between the dark current of the corresponding active pixel and the dark current of the corresponding optical pixel block.

17. A method of operating an image sensing device, the method comprising:
heating a pixel array including active pixels and optical black pixels to a set temperature;
heating a plurality of test pixel blocks to temperatures higher than the set temperature;
extracting pixel signals in accordance with temperatures from the pixel array and the test pixel blocks; and
obtaining pedestal information of the pixel array using the pixel signals.

18. The method of claim 17, wherein obtaining the pedestal information comprises obtaining the pedestal information for different colors of the test pixel blocks in accordance with the temperatures.

19. The method of claim 17, further comprising:
storing the pedestal information; and
correcting a pedestal of a chip including the pixel array using the pedestal information.

* * * * *